(12) United States Patent
Yamada (10) Patent No.: US 10,268,935 B2
(45) Date of Patent: *Apr. 23, 2019

(54) TAPE PRINTING APPARATUS AND CONTROL METHOD FOR TAPE PRINTING APPARATUS

(71) Applicant: Seiko Epson Corporation, Tokyo (JP)

(72) Inventor: Tsutomu Yamada, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,776

(22) Filed: Feb. 15, 2017

(65) Prior Publication Data
US 2017/0243091 A1 Aug. 24, 2017

(30) Foreign Application Priority Data

Feb. 18, 2016 (JP) .................. 2016-029378

(51) Int. Cl.
*G06F 3/12* (2006.01)
*G06K 15/02* (2006.01)

(52) U.S. Cl.
CPC ....... *G06K 15/1859* (2013.01); *G06F 3/1205* (2013.01); *G06F 3/1236* (2013.01); *G06F 3/1253* (2013.01); *G06F 3/1292* (2013.01); *G06K 15/022* (2013.01); *G06K 15/181* (2013.01); *G06K 15/1802* (2013.01); *G06K 15/1828* (2013.01)

(58) Field of Classification Search
None
See application file for complete search history.

(56) References Cited

U.S. PATENT DOCUMENTS

| 2003/0054859 A1 | 3/2003 | Goto |
| 2006/0198679 A1 | 9/2006 | Tanaka et al. |
| 2008/0291283 A1 | 11/2008 | Achiwa et al. |
| 2009/0117849 A1* | 5/2009 | Mizoguchi ........ H04M 1/72522 455/41.2 |
| 2009/0257088 A1* | 10/2009 | Tokashiki .............. G06K 15/00 358/1.15 |

(Continued)

FOREIGN PATENT DOCUMENTS

| EP | 1942444 | 7/2008 |
| JP | 2004-025468 | 1/2004 |

(Continued)

OTHER PUBLICATIONS

European Search Report issued in related Patent Application No. EP-17156271, dated Jul. 10, 2017.

(Continued)

*Primary Examiner* — Fan Zhang
(74) *Attorney, Agent, or Firm* — ALG Intellectual Property, LLC (57) ABSTRACT

A tape printing apparatus includes an input unit for performing editing, a temporary storage unit configured to temporarily store editing information being edited by the tape printing apparatus, and an editing-information transmitting unit configured to transmit the editing information to a portable terminal when a first operation button included in the input unit is operated in a state in which the editing information is stored in the temporary storage unit.

5 Claims, 8 Drawing Sheets

(56) References Cited

U.S. PATENT DOCUMENTS

| | | | |
|---|---|---|---|
| 2012/0268756 A1 | 10/2012 | Kurashina | |
| 2013/0258404 A1 | 10/2013 | Tabata et al. | |
| 2014/0022568 A1* | 1/2014 | Nakaya | B65C 9/46 |
| | | | 358/1.6 |
| 2014/0199105 A1 | 7/2014 | Tsukuda | |
| 2014/0327787 A1* | 11/2014 | Tsujimoto | H04N 1/32112 |
| | | | 348/207.2 |
| 2015/0149547 A1* | 5/2015 | Nakamura | H04L 67/10 |
| | | | 709/204 |
| 2015/0365985 A1* | 12/2015 | Terashita | H04W 76/02 |
| | | | 370/329 |
| 2017/0006178 A1* | 1/2017 | Yamada | H04B 5/0031 |
| 2017/0180595 A1* | 6/2017 | Tokumaru | H04N 1/32512 |

FOREIGN PATENT DOCUMENTS

| | | |
|---|---|---|
| JP | 2005-349746 A | 12/2005 |
| JP | 2009-075410 A | 4/2009 |
| JP | 2013-206227 A | 10/2013 |
| JP | 2014-133377 A | 7/2014 |
| JP | 2016-016631 | 1/2016 |

OTHER PUBLICATIONS

King Jim Co., Ltd., Tepra Pro SR550 user manual, Oct. 2013, p. 14, King Jim Co., Ltd., Japan.
European Search Report issued in related Patent Application No. EP-17156282, dated Jun. 30, 2017.

* cited by examiner

TAPE PRINTING APPARATUS AND CONTROL METHOD FOR TAPE PRINTING APPARATUS

BACKGROUND

1. Technical Field

The present invention relates to a printing apparatus capable of transmitting editing information to an external apparatus and a control method for the printing apparatus.

2. Related Art

JP-A-2014-133377 (Patent Literature 1) has been known as a technique of this type. Patent Literature 1 discloses a tape printing apparatus that stores, as a file, data (editing information) input from an input unit. There has been also known a function of transmitting, on the basis of a command from an external apparatus such as a personal computer, a file stored in the tape printing apparatus to the external apparatus and storing the file in the external apparatus as backup data.

On the other hand, among existing tape printing apparatuses, there is a model capable of receiving printing data generated by an external apparatus (a dedicated application). For example, a tape printing apparatus described in "TEPRA" PRO SR550 user's manual, page 14, October 2013, Second Edition, King Jim Co., Ltd. (Non Patent Literature 1) is capable of switching an external communication mode (a personal computer link mode) for receiving printing data generated by an external apparatus and creating a label and a standalone mode for creating a label on the basis of an input by an input unit mounted on the tape printing apparatus.

In the case of the model capable of switching the external communication mode and the standalone mode, for example, editing of a label is performed in the tape printing apparatus. However, there is a demand for continuously performing the editing of the label on the external apparatus side halfway. This is because, in the external apparatus, in general, work efficiency is higher than in the tape printing apparatus because, for example, a large screen can be used and multiple functions can be realized by the dedicated application. However, in the related art, it is necessary to perform troublesome operation for, in order to transfer editing work from the tape printing apparatus to the external apparatus, once storing editing information of the label in the tape printing apparatus as a file and operating the external apparatus to cause the tape printing apparatus to transmit the editing information to the external apparatus.

SUMMARY

An advantage of some aspects of the invention is to provide a printing apparatus capable of easily handing over editing work to an external apparatus and a control method for the printing apparatus.

A printing apparatus according to an aspect of the invention includes: a temporary storage unit configured to temporarily store editing information being edited by the printing apparatus; and an editing-information transmitting unit configured to transmit the editing information to an external apparatus when a first trigger occurs in a state in which the editing information is stored in the temporary storage unit.

A control method for a printing apparatus according to an aspect of the invention includes: storing editing information being edited by the printing apparatus in a temporary storage unit; and transmitting the editing information to an external apparatus when a first trigger occurs in a state in which the editing information is stored in the temporary storage unit.

With the configuration according to the aspect of the invention, it is possible to transmit the editing information being edited to the external apparatus by causing the first trigger when the editing information is edited by the printing apparatus. That is, it is possible to easily transfer editing work from the printing apparatus to the external apparatus without requiring troublesome work for, for example, once storing the editing information in the printing apparatus as a file and operating the external apparatus to cause the printing apparatus to transmit the editing information to the external apparatus.

The printing apparatus according to the aspect of the invention may further include: a command transmitting unit configured to transmit a transmission command for the editing information being edited by the external apparatus to the external apparatus; and an editing-information receiving unit configured to receive the editing information from the external apparatus. The temporary storage unit may store the editing information received from the external apparatus.

With the configuration of the aspect of the invention, by causing the second trigger, it is possible to receive the editing information being edited by the external apparatus and store the editing information in the temporary storage unit. That is, it is possible to easily transfer the editing work from the external apparatus to the printing apparatus with simple operation for causing the second trigger. Note that it is conceivable that the editing work is handed over from the external apparatus to the printing apparatus, for example, when some deficiency occurs in the external apparatus, when the external apparatus is used for other work, and when a user desires to shift the editing work to the printing apparatus because the user is unfamiliar with the editing in the external apparatus.

The printing apparatus according to the aspect of the invention may further include: a printing-data generating unit configured to generate printing data on the basis of the editing information stored in the temporary storage unit; and an operation-mode setting unit configured to set an operation mode in one of a first mode for performing printing on the basis of printing data transmitted from the external apparatus and a second mode for performing printing on the basis of the printing data generated by the printing-data generating unit. The operation-mode setting unit may set the operation mode in the first mode when the first trigger occurs when the operation mode is set in the second mode and set the operation mode in the second mode when the second trigger occurs when the operation mode is set in the first mode.

With the configuration according to the aspect of the invention, by causing the first trigger, it is possible to realize not only the handover of the editing work to the external apparatus but also the shift of the operation mode to the first mode. Similarly, by causing the second trigger, it is possible to realize not only the handover of the editing work from the external apparatus but also the shift of the operation mode to the second mode.

The printing apparatus according to the aspect of the invention may further include a connection-establishment processing unit configured to spontaneously perform connection establishment processing when the first trigger occurs in a state in which the editing information is stored in the temporary storage unit and connection to the external apparatus is not established and when the second trigger occurs in a state in which connection to the external apparatus is not established.

With the configuration according to the aspect of the invention, since the connection establishment processing for establishing connection to the external apparatus is performed according to the occurrence of the first trigger or the second trigger, it is possible to save labor and time for connection establishment operation by the user.

The printing apparatus according to the aspect of the invention may further include an input unit including a first operation button and a second operation button. The first trigger may be operation of the first operation button and the second trigger may be operation of the second operation button.

With the configuration according to the aspect of the invention, it is possible to easily cause the first trigger or the second trigger according to the operation of the first operation button or the second operation button.

The printing apparatus according to the aspect of the invention may further include a posture determining unit configured to determine an apparatus posture. The first trigger may be determination of a first posture by the posture determining unit and the second trigger may be determination of a posture other than the first posture by the posture determining unit.

With the configuration according to the aspect of the invention, it is possible to easily cause the first trigger or the second trigger simply by changing the apparatus posture. In particular, when the shift of the operation mode is realized according to the occurrence of the first trigger or the second trigger, the printing apparatus is often used in a specific posture having a small setting area in order to secure a setting space of the external apparatus when the first mode (a mode for communicating with the external apparatus) is used. Therefore, when it is determined that the printing apparatus is in the posture, by setting the operation mode in the first mode, it is possible to switch the operation mode to an appropriate operation mode without causing the user to be aware of the switching of the operation mode.

In the printing apparatus according to the aspect of the invention, the editing information may include text information and setting information.

In the printing apparatus according to the aspect of the invention, the setting information may include information concerning setting of a text decoration or a format.

With the configuration of the aspect of the invention, it is possible to transfer text information and setting information as the editing information. The setting information includes the information concerning the setting of the text decoration or the format. Therefore, it is possible to save labor and time for setting the text decoration and the format again at a handover destination of the editing work.

BRIEF DESCRIPTION OF THE DRAWINGS

The invention will be described with reference to the accompanying drawings, wherein like numbers reference like elements.

DESCRIPTION OF EXEMPLARY EMBODIMENTS

A printing apparatus and a control method for the printing apparatus according to the invention are explained with reference to the accompanying drawings. In an embodiment of the invention, an example is explained in which the printing apparatus according to the invention is applied to a tape printing apparatus for creating a label.

Figure 1:
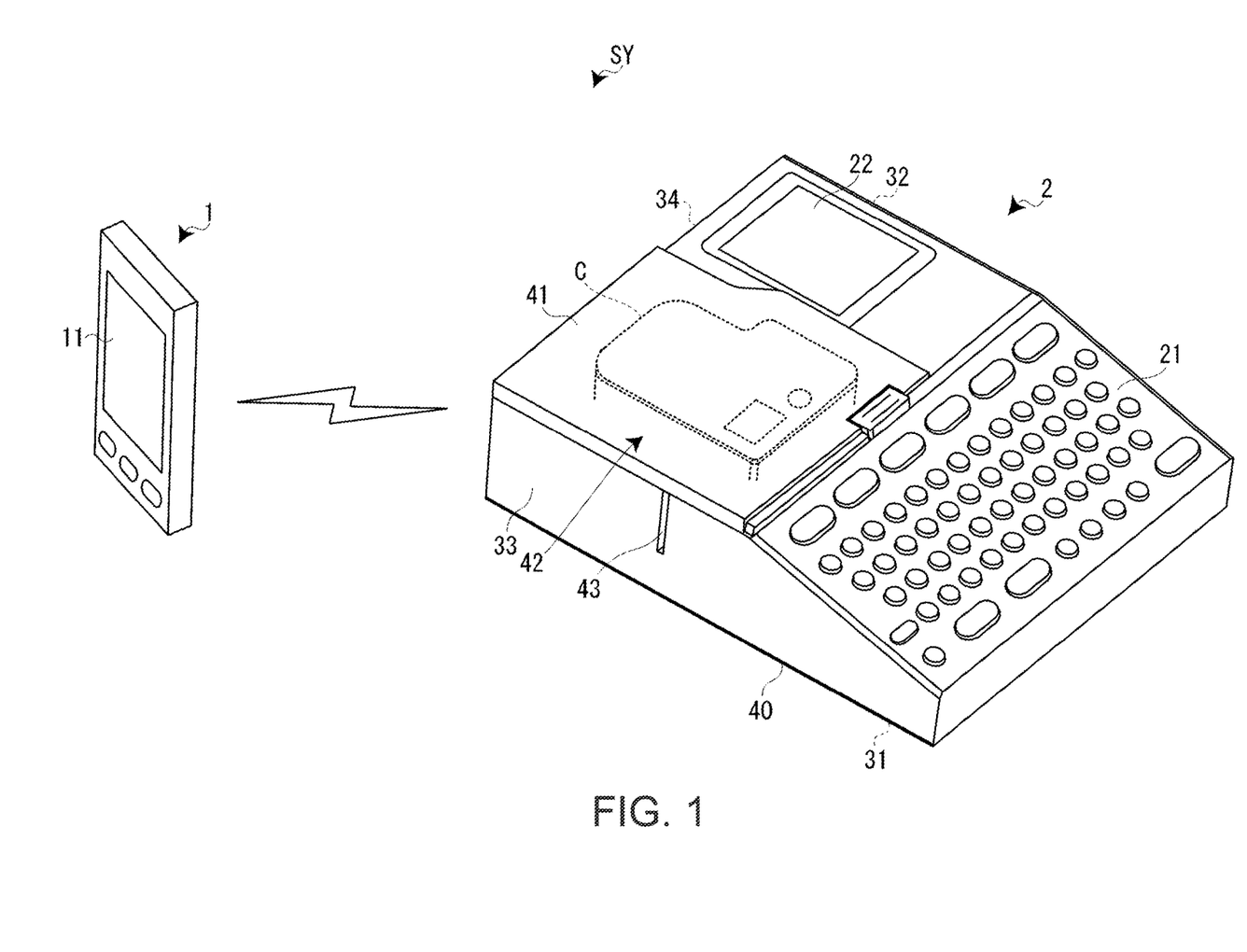
FIG. 1 is an external perspective view of a portable terminal and a tape printing apparatus (horizontal installation).

FIG. 1 shows a printing system SY including a portable terminal 1 (an external apparatus) and a tape printing apparatus 2. In the printing system SY in this embodiment, both of the portable terminal 1 and the tape printing apparatus 2 include a label editing function. It is possible to transfer editing work for a label from the tape printing apparatus 2 to the portable terminal 1 and from the portable terminal 1 to the tape printing apparatus 2.

The portable terminal 1 is realized by an information processing apparatus such as anyone of various tablet terminals (a smartphone, etc.) or a notebook personal computer. In the figure, an example is shown in which a smartphone mounted with a touch panel 11 is used as the portable terminal 1. The portable terminal 1 communicates with the tape printing apparatus 2 according to wireless communication such as the Bluetooth (registered trademark). Note that, for the communication between the portable terminal 1 and the tape printing apparatus 2, a wired communication standard such as the USB communication or the Ethernet (registered trademark) may be used.

On the other hand, the exterior of the tape printing apparatus 2 is formed by an apparatus case 40. A keyboard 21 including various input keys and buttons is disposed on the front upper surface of the apparatus case 40. An openable lid 41 is attached to a left part of the rear upper surface of the apparatus case 40. A display screen 22 is disposed on a right part of the rear upper surface. A cartridge loading section 42 for loading a tape cartridge C is recessed and formed on the inner side of the openable lid 41. The tape cartridge C is loaded in the cartridge loading section 42 in a state in which the openable lid 41 is opened. A printing head 27a of a thermal system, a tape feeding motor 27b functioning as a tape conveying mechanism, a cutter motor 27c that drives a tape cutter 27d explained below, and the like are incorporated in the cartridge loading section 42. Note that the tape cartridge C houses a tape reel on which a printing tape, which is a long printing medium, is wound and a ribbon reel on which an ink ribbon is wound (none of the tape reel and the ribbon reel are shown in the figure).

In the left side part of the apparatus case 40, a tape discharge port 43, which causes the cartridge loading section 42 and the outside to communicate, is formed. The tape cutter 27d for cutting the printing tape reeled out from the tape cartridge C faces the tape discharge port 43. When the printed printing tape is fed out from the tape discharge port 43, the printing tape is cut by the tape cutter 27d in a state in which the feeding of the printing tape is once stopped. A strip-like label is created.

Figure 2:
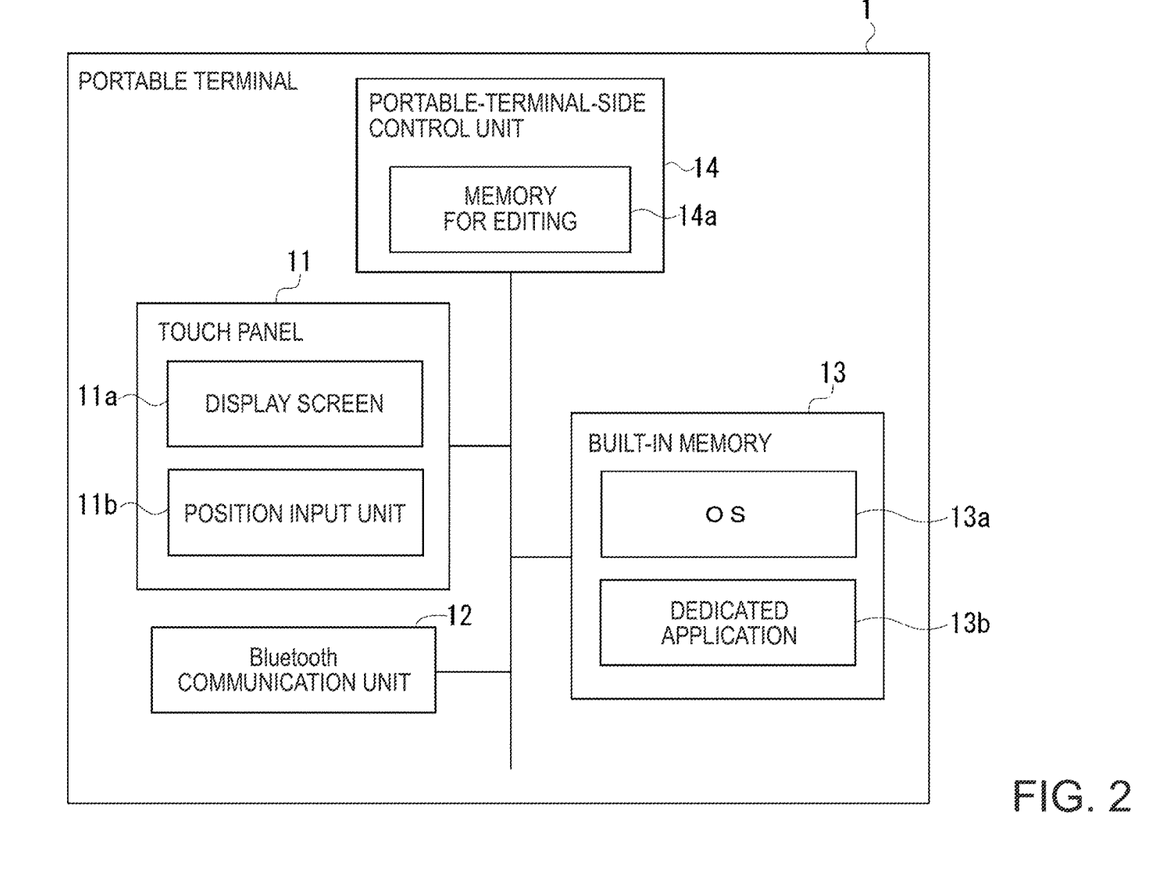
FIG. 2 is a block diagram showing a hardware configuration of the portable terminal.

Hardware configurations of the portable terminal 1 and the tape printing apparatus 2 are explained with reference to FIGS. 2 and 3. FIG. 2 is a block diagram of the portable terminal 1. The portable terminal 1 includes, as hardware components, the touch panel 11, a Bluetooth communication unit 12, a built-in memory 13, and a portable-terminal-side control unit 14.

The touch panel 11 includes a display screen 11a and a position input unit 11b. The display screen 11a is realized by a liquid crystal panel or the like. The display screen 11a displays various kinds of information such as an editing screen (not shown in the figure) for performing editing of a label. On the other hand, the position input unit 11b detects an operation position of a user according to a resistance film system or a capacitance system. The Bluetooth communication unit 12 performs wireless communication after performing connection establishment processing (pairing processing) for establishing connection to the tape printing apparatus 2 to establish connection on the basis of the Bluetooth communication standard.

The built-in memory 13 is realized by, for example, a flash ROM (registered trademark). The built-in memory 13 stores an OS (Operating System) 13a and a dedicated application 13b. The dedicated application 13b is a smartphone application for controlling the tape printing apparatus 2.

The portable-terminal-side control unit 14 is realized by a CPU (Central Processing Unit), a RAM (Random Access Memory), and the like. The portable-terminal-side control unit 14 performs generation processing for printing data supplied to the tape printing apparatus 2 and communication control for communication with the tape printing apparatus 2 in cooperation with the units 11 to 13 explained above. A part of the RAM is used as a memory for editing 14a. The memory for editing 14a is used as, during editing of a label in the portable terminal 1, a work area for storing editing information indicating content of the editing.

Figure 3:
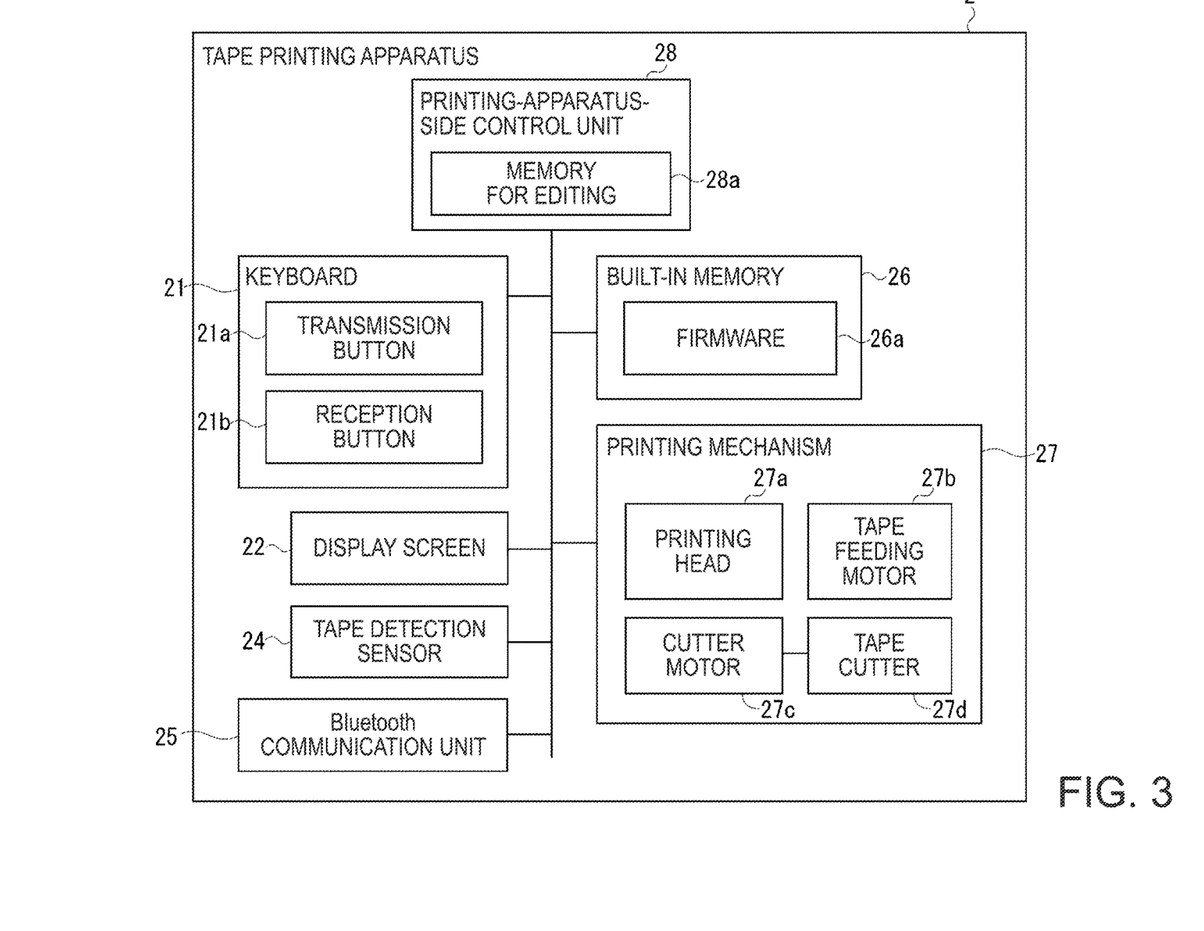
FIG. 3 is a block diagram showing a hardware configuration of the tape printing apparatus.

FIG. 3 is a block diagram of the tape printing apparatus 2. The tape printing apparatus 2 includes, as hardware components, the keyboard 21, the display screen 22, a tape detection sensor 24, a Bluetooth communication unit 25, a built-in memory 26, a printing mechanism 27, and a printing-apparatus-side control unit 28.

The keyboard 21 is used to perform input and the like of a text and an image for generating printing data. The keyboard 21 includes a transmission button 21a (a first operation button) for transmitting editing information of a label to the portable terminal 1 and a reception button 21b (a second operation button) for receiving editing information of a label from the portable terminal 1. The display screen 22 displays an input result (editing content of a label), a detection result of the tape detection sensor 24, and the like.

The tape detection sensor 24 detects tape information concerning the printing tape stored in the tape cartridge C. The tape detection sensor 24 detects, as the tape information, a tape width, a tape material, a tape color, and the like of the printing tape. Note that, as a detection method, a method of reading an image (a barcode, a two-dimensional code, etc.) or RFID (Radio Frequency Identification) stuck or printed on the tape cartridge C, a method of detecting presence or absence of one or more holes formed in the tape cartridge C, and the like are conceivable. The Bluetooth communication unit 25 performs communication with the portable terminal 1 on the basis of the Bluetooth communication standard.

The built-in memory 26 is realized by, for example, a flash ROM (registered trademark). The built-in memory 26 stores firmware 26a of the tape printing apparatus 2. The printing mechanism 27 includes the printing head 27a, the tape feeding motor 27b, the cutter motor 27c, and the tape cutter 27d.

The printing-apparatus-side control unit 28 is realized by a CPU, a RAM, and the like. The printing-apparatus-side control unit 28 performs communication control for communication with the portable terminal 1 and printing control in cooperation with the units 21 to 27. A part of the RAM is used as a memory for editing 28a. The memory for editing 28a is used as, during label editing in the tape printing apparatus 2, a work area for storing editing information indicating content of the editing.

Figure 4:
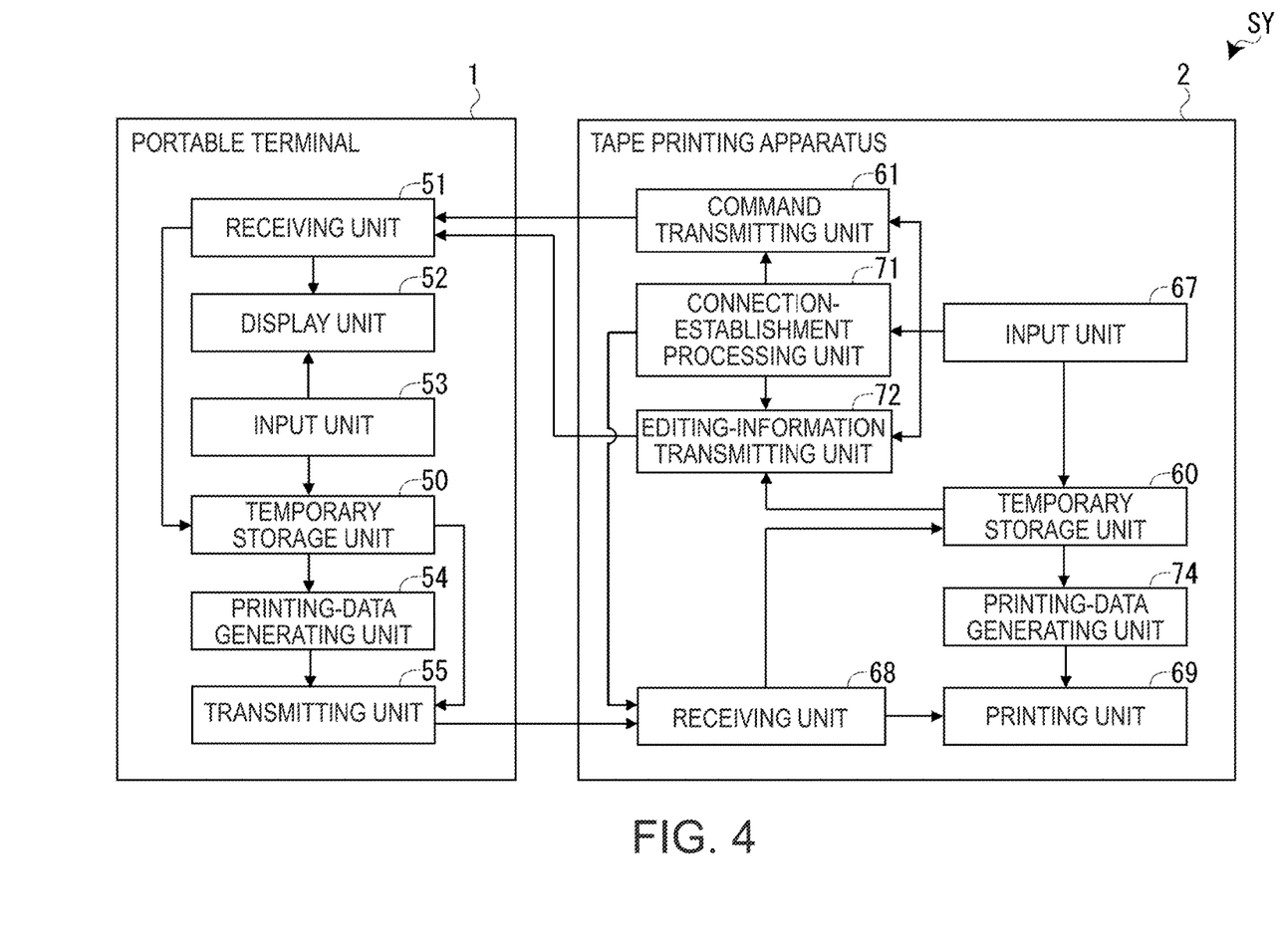
FIG. 4 is a block diagram showing a functional configuration of a printing system.

A functional configuration of the printing system SY is explained with reference to FIG. 4. The portable terminal 1 includes, as functional components, a receiving unit 51, a display unit 52, an input unit 53, a temporary storage unit 50, a printing-data generating unit 54, and a transmitting unit 55.

The receiving unit 51 receives, from the tape printing apparatus 2, editing information being edited by the tape printing apparatus 2 (hereinafter referred to as "first editing information") and receives a transmission command for causing the portable terminal 1 to transmit editing information being edited by the portable terminal 1 (hereinafter referred to as "second editing information") to the tape printing apparatus 2. The first editing information received from the tape printing apparatus 2 is stored in the temporary storage unit 50 as the second editing information (as information editable by the portable terminal 1). That is, the second editing information may be information input from any one of the input unit 53 and an input unit 67 of the tape printing apparatus 2.

Note that both of the first editing information and the second editing information include text information and setting information. Image information (bitmap data, etc.) may be included in the editing information. The text information of the information included in the editing information indicates input information of characters (including numbers, signs, and pictorial symbols). On the other hand, the setting information includes information concerning setting of a text decoration or a format. The text decoration indicates information concerning setting of decorative characters (shadow characters, outline characters, etc.), slanted characters, enhanced print characters, extension and contraction of characters, character enclosures, shaded characters, character intervals, fonts, character sizes, layouts, outer frames, tabular work, character directions, and the like. The format indicates information concerning setting of fixed length printing, woven pattern printing, margins in front and back and above and below a label, and the like.

The display unit 52 displays the second editing information and the like. The input unit 53 is equivalent to the touch panel 11 and is used to input information for creating a label. The temporary storage unit 50 is equivalent to the memory for editing 14a, which is a volatile storage medium, and temporarily stores the second editing information.

The printing-data generating unit 54 generates printing data on the basis of the second editing information stored in the temporary storage unit 50. The printing data includes various commands such as a command for printing characters and images and a command for cutting the printing tape.

The transmitting unit 55 transmits the printing data generated by the printing-data generating unit 54 to the tape printing apparatus 2. The transmitting unit 55 transmits the second editing information to the tape printing apparatus 2 when a transmission command for the second editing information is received from the tape printing apparatus 2 and when the portable terminal 1 is editing a label (when the second editing information is stored in the temporary storage unit 50).

On the other hand, the tape printing apparatus 2 includes, as functional components, a command transmitting unit 61, a connection-establishment processing unit 71, an editing-information transmitting unit 72, a receiving unit 68 (an editing-information receiving unit), the input unit 67, a temporary storage unit 60, a printing-data generating unit 74, and a printing unit 69.

The input unit 67 is equivalent to the keyboard 21 and is used to input information for creating a label. The input unit 67 includes a first operation button (the transmission button 21a) for causing a first trigger and a second operation button (the reception button 21b) for causing a second trigger. The temporary storage unit 60 is equivalent to the memory for editing 28a, which is a volatile storage medium, and temporarily stores the first editing information (a storing step).

The connection-establishment processing unit 71 spontaneously performs connection establishment processing when the first trigger occurs (when the transmission button 21a is operated) in a state in which the first editing information is stored in the temporary storage unit 60 and connection to the portable terminal 1 is not established and when the second trigger occurs (when the reception button 21b is operated) in a state in which connection to the portable terminal 1 is not established.

The command transmitting unit 61 transmits, when the second trigger occurs, to the portable terminal 1, a transmission command for causing the portable terminal 1 to transmit the second editing information to the tape printing apparatus 2. Note that, when the connection establishment processing is performed by the connection-establishment processing unit 71, the command transmitting unit 61 transmits the transmission command after the connection establishment processing. The editing-information transmitting unit 72 transmits the first editing information to the portable terminal 1 when the first trigger occurs in a state in which the first editing information is stored in the temporary storage unit 60 (an editing-information transmitting step).

The receiving unit 68 receives the second editing information from the portable terminal 1 in response to the transmission command. The second editing information received from the portable terminal 1 is stored in the temporary storage unit 60 as the first editing information (as information editable by the tape printing apparatus 2). That is, the first editing information may be information input from any one of the input unit 67 and the input unit 53 of the portable terminal 1.

The receiving unit 68 receives printing data from the portable terminal 1.

The printing-data generating unit 74 generates printing data on the basis of the first editing information stored in the temporary storage unit 60. The printing unit 69 performs printing on the basis of the printing data generated by the printing-data generating unit 74 or the printing data received by the receiving unit 68.

Figure 5:
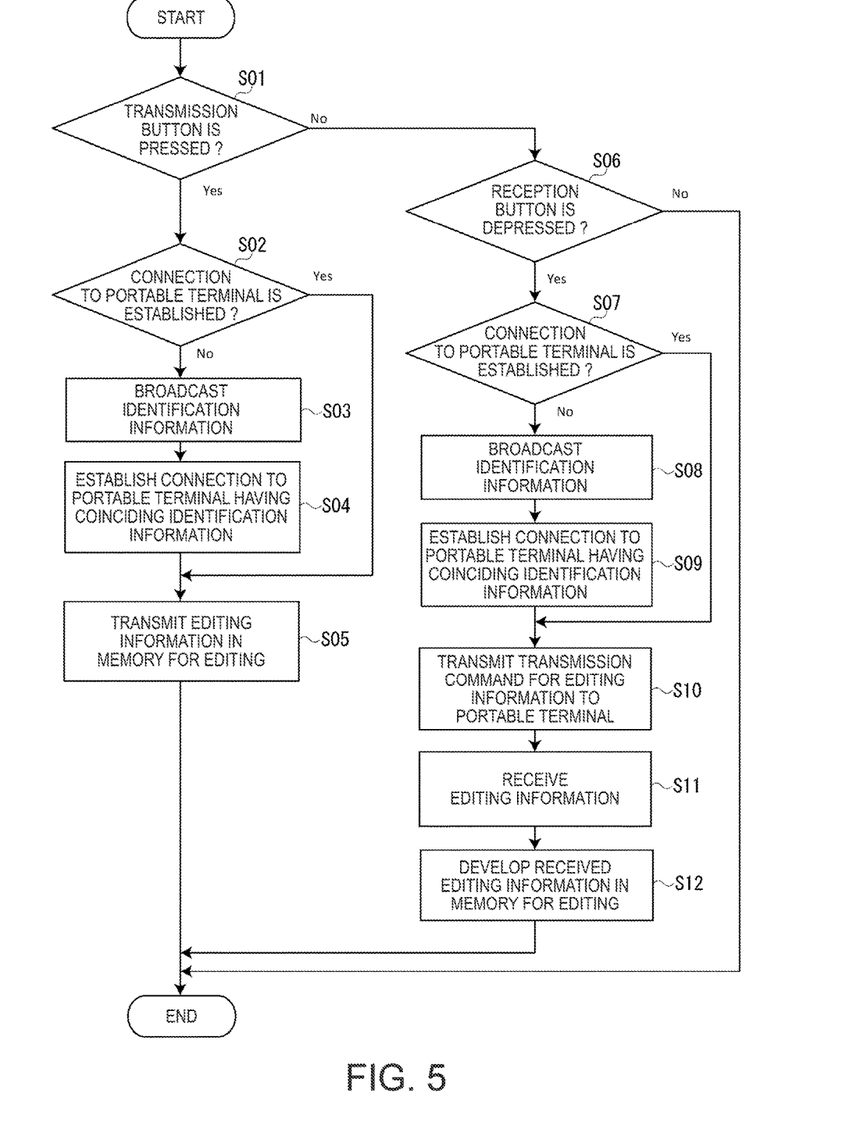
FIG. 5 is a flowchart for explaining a flow of editing work handover processing of the tape printing apparatus.

A flow of editing work handover processing of the tape printing apparatus 2 is explained with reference to a flowchart of FIG. 5. Note that the flowchart of the figure is periodically repeated after a power supply of the tape printing apparatus 2 is turned on. First, the tape printing apparatus 2 determines whether the transmission button 21a is pressed (operated) (S01). When determining that the transmission button 21a is pressed (Yes in S01), the tape printing apparatus 2 determines whether connection to the portable terminal 1 is established (S02). When determining that the connection is not established (No in S02), the tape printing apparatus 2 broadcasts identification information of the tape printing apparatus 2 (S03) and establishes connection to the portable terminal 1 having identification information coinciding with the identification information of the tape printing apparatus 2 (S04). When the connection is established, the portable terminal 1 transmits the editing information (the first editing information) in the memory for editing 28a to the tape printing apparatus 2 (S05). Note that, when it is determined "Yes" in S02, S03 and S04 are omitted.

On the other hand, when determining "No" in S01, the tape printing apparatus 2 determines whether the reception button 21b is pressed (operated) (S06). When determining that the reception button 21b is pressed (Yes in S06), the tape printing apparatus 2 determines whether connection to the portable terminal 1 is established (S07). When determining that the connection is not established (No in S07), the tape printing apparatus 2 broadcasts the identification information of the tape printing apparatus 2 (S08) and establishes connection to the portable terminal 1 having identification information coinciding with the identification information of the tape printing apparatus 2 (S09). When the connection is established, the tape printing apparatus 2 transmits a transmission command for the editing information (the second editing information) being edited to the portable terminal 1 (S10) and thereafter receives the editing information from the portable terminal 1 (S11). The tape printing apparatus 2 develops the received editing information in the memory for editing 28a (S12). Note that, when it is determined "Yes" in S07, S08 and S09 are omitted.

As explained above, when the transmission button 21a is pressed while label editing is performed, the tape printing apparatus 2 in this embodiment transmits the editing information (the first editing information) being edited to the portable terminal 1. That is, the user can easily perform handover of label editing work from the tape printing apparatus 2 to the portable terminal 1 simply by pressing the transmission button 21a. When the reception button 21b is pressed, the tape printing apparatus 2 transmits the transmission command for the editing information (the second editing information) being editing by the portable terminal 1 to the portable terminal 1. That is, the user can easily perform the handover of the label editing work from the portable terminal 1 to the tape printing apparatus 2 simply by pressing the reception button 21b.

When the transmission button 21a or the reception button 21b is pressed, the tape printing apparatus 2 spontaneously performs the connection establishment processing for establishing connection to the portable terminal 1. Therefore, it is possible to save labor and time of connection establishment operation by the user. When the editing work is handed over, since the text information and the setting information are transmitted and received as the editing information, it is possible to save labor and time for setting a text decoration and a format again at a handover destination.

Note that modifications explained below are adoptable irrespective of the embodiment explained above.

Modification 1

In a modification 1, an operation mode of the tape printing apparatus 2 is switched according to the pressing of the transmission button 21a and the reception button 21b. The operation mode is switched between an external communication mode (a first mode) and a standalone mode (a second mode). The external communication mode is a mode for receiving printing data from the portable terminal 1 and disabling an information input from the input unit 67 (the keyboard 21). On the other hand, the standalone mode is a mode for generating printing data on the basis of information input from the input unit 67 without receiving printing data from the portable terminal 1.

Figure 6:
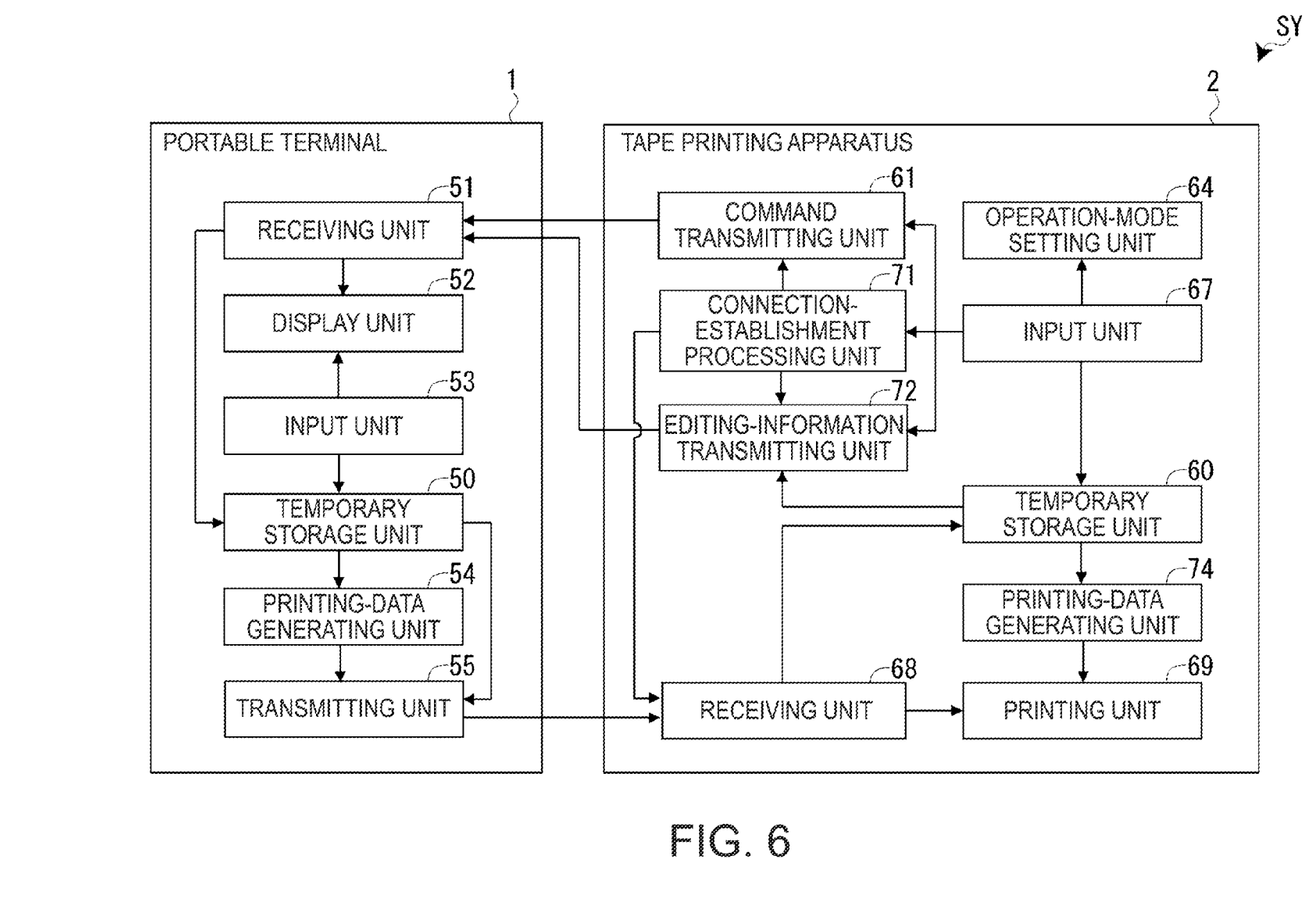
FIG. 6 is a block diagram showing a functional configuration of a printing system according to a modification 1.

FIG. 6 is a block diagram showing a functional configuration of the printing system SY according to the modification 1. In this modification, when compared with the functional configuration of the embodiment explained above (see FIG. 4), an operation-mode setting unit 64 is added in the tape printing apparatus 2. The operation-mode setting unit 64 sets the operation mode in one of the external communication mode and the standalone mode. Specifically, when the transmission button 21a is pressed (when the first trigger occurs) when the operation mode is set in the standalone mode (the second mode), the operation-mode setting unit 64 sets the operation mode in the external communication mode. However, the operation-mode setting unit 64 sets the external communication mode after the tape printing apparatus 2 transmits the first editing information to the portable terminal 1. Conversely, when the reception button 21b is pressed (when the second trigger occurs) when the operation mode is set in the external communication mode (the first mode), the operation-mode setting unit 64 sets the operation mode in the standalone mode. However, the operation-mode setting unit 64 sets the standalone mode after the tape printing apparatus 2 transmits the transmission command and receives the second editing information.

In this way, according to the modification 1, it is possible to realize not only the handover of the editing work to the portable terminal 1 but also the shift of the operation mode to the external communication mode by pressing the transmission button 21a. Similarly, it is possible to realize not only the handover of the editing work from the portable terminal 1 but also the shift of the operation mode to the standalone mode by pressing the reception button 21b. Therefore, it is possible to save labor and time for operation mode switching operation by the user.

Modification 2

In a modification 2, the operation mode is switched and the handover of the editing work is performed according to an apparatus posture of the tape printing apparatus 2. That is, a determination result of the apparatus posture is used as the first trigger or the second trigger. The tape printing apparatus 2 in this modification is usable in a posture of "vertical installation" (a first posture) shown in FIG. 8 or a posture of "horizontal installation" shown in FIG. 1. The "vertical installation" means a posture in which a bottom surface 31 of the tape printing apparatus 2 is perpendicular to a setting table (not shown in the figure) (substantially parallel to the earth's axis), that is, a posture in which a rear surface 34 is a setting surface. The "horizontal installation" means a posture in which the bottom surface 31 of the tape printing apparatus 2 is horizontal to the setting table, that is, a posture in which the bottom surface 31 is the setting surface.

Figure 7:
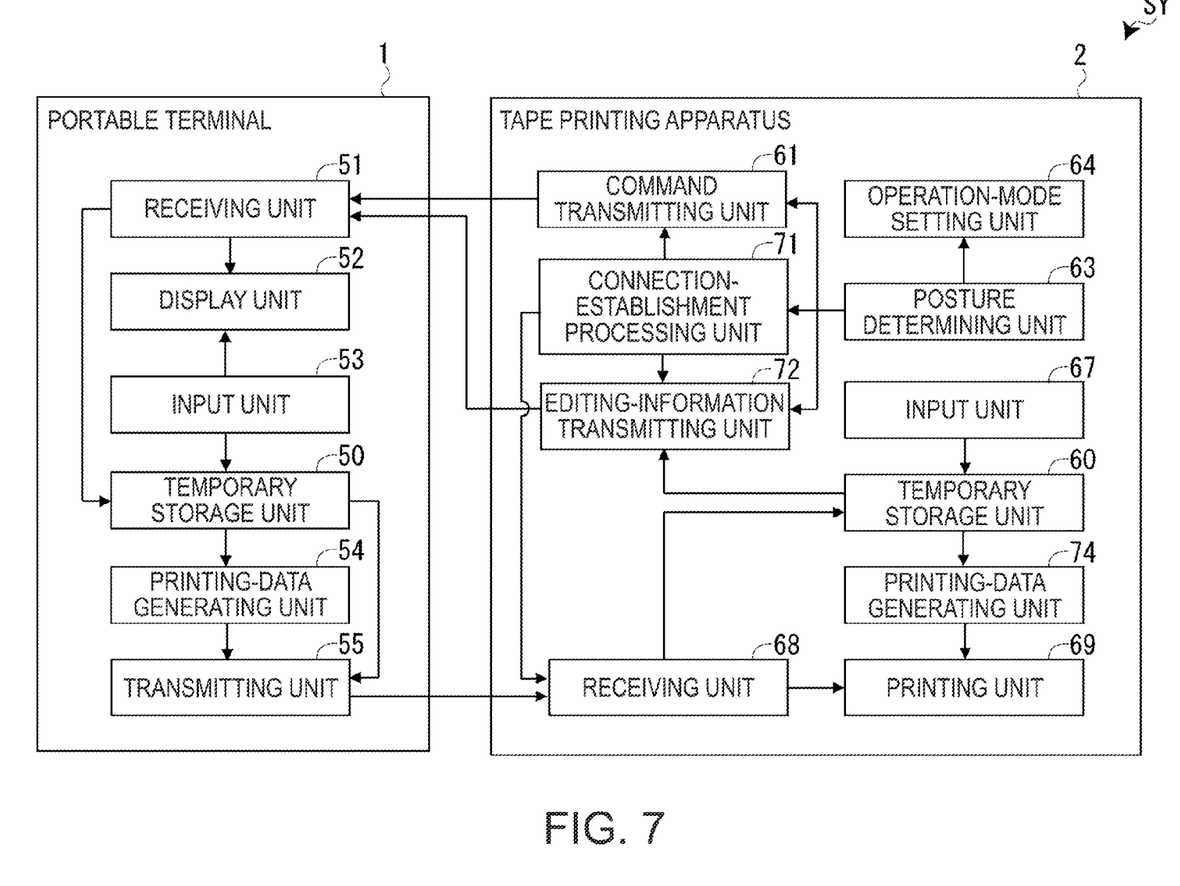
FIG. 7 is a block diagram showing a functional configuration of a printing system according to a modification 2.

FIG. 7 is a block diagram showing a functional configuration of the printing system SY according to the modification 2. In this modification, when compared with the functional configuration of the modification 1 (see FIG. 6), a posture determining unit 63 is added in the tape printing apparatus 2. Note that, in the input unit 67 in this modification, the first operation button (the transmission button 21a) and the second operation button (the reception button 21b) can be omitted. The posture determining unit 63 always (periodically after power-on) determines the apparatus posture of the tape printing apparatus 2 on the basis of a detection result of a not-shown posture detection sensor such as a gravitational acceleration sensor. Specifically, the posture determining unit 63 determines whether the tape printing apparatus 2 is in the posture of the "vertical installation" (see FIG. 8) or a posture other than the "vertical installation".

Figure 8:
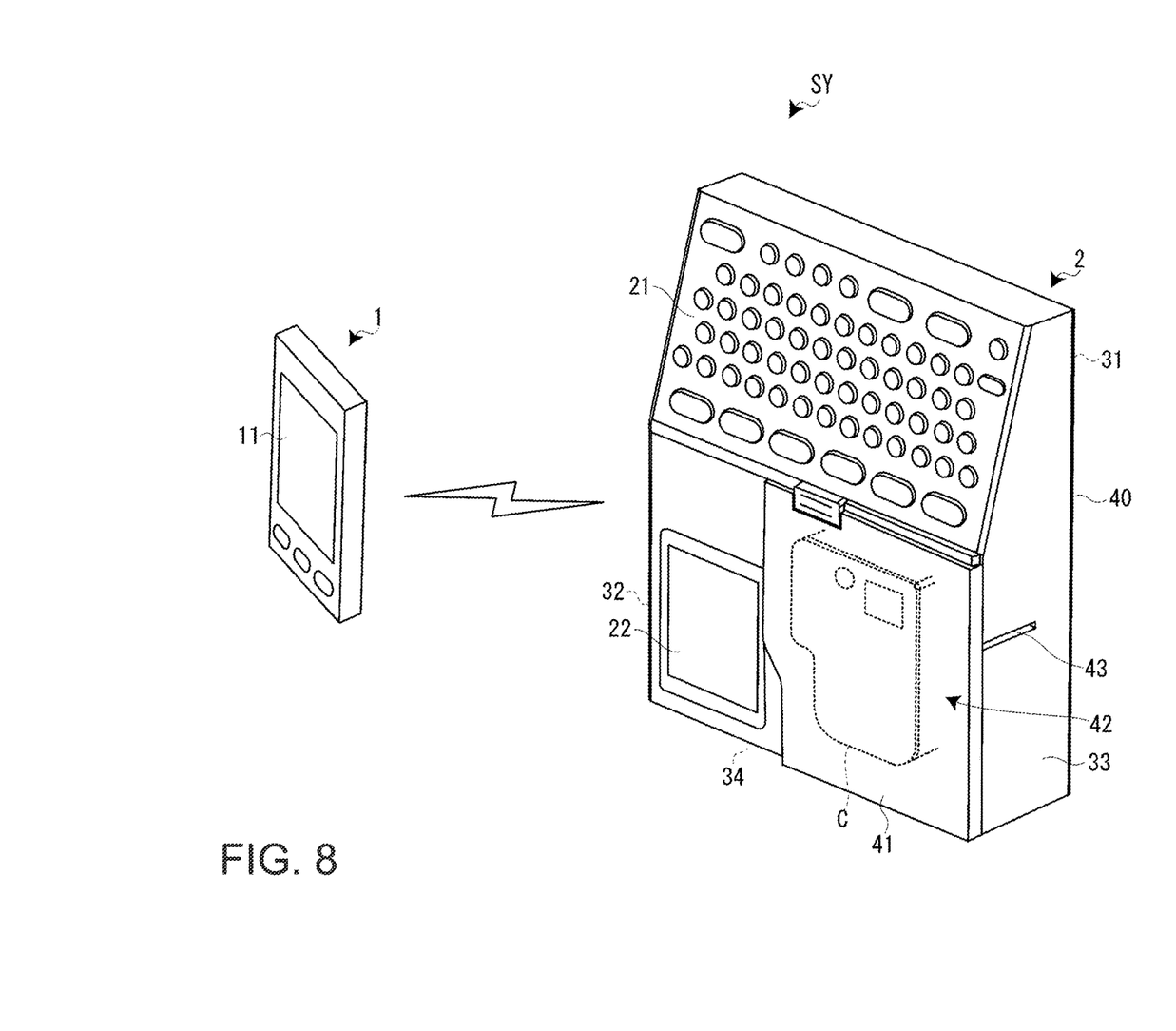
FIG. 8 is an external perspective view of the portable terminal and the tape printing apparatus (vertical installation).

When the posture determining unit 63 determines that the apparatus posture of the tape printing apparatus 2 is the "vertical installation", the operation-mode setting unit 64 in this modification sets the operation mode in the external communication mode. Note that the "vertical installation" is a posture in which the setting area of the tape printing apparatus 2 is the smallest and is a posture in which the tape printing apparatus 2 is self-sustainable. When the posture determining unit 63 determines that the apparatus posture of the tape printing apparatus 2 is the posture other than the "vertical installation", the operation-mode setting unit 64 sets the operation mode in the standalone mode. Note that, in this modification, as shown in FIG. 1, the operation mode is set in the standalone mode not only when the apparatus posture of the tape printing apparatus 2 is the "horizontal installation" but also when the apparatus posture is a posture in which a right side surface 32 of the tape printing apparatus 2 faces down.

In this way, according to the modification 2, it is possible to easily cause the first trigger or the second trigger simply by changing the apparatus posture. Since the operation mode is set in the external communication mode when the apparatus posture is the "vertical installation", it is possible to reduce the setting area and effectively use a work space on a desk. The tape printing apparatus 2 in this embodiment always determines the apparatus posture in the power-on state. Therefore, the user can easily switch the operation mode without being required to perform operation of a power button and operation for determining the apparatus posture.

Note that, as still another modification, the tape printing apparatus 2 may additionally include a tape-information transmitting unit (not shown in the figure) that transmits tape information detected by the tape detection sensor 24 to the portable terminal 1 together with the editing information when the posture determining unit 63 determines that the apparatus posture of the tape printing apparatus 2 is changed from the posture other than the "vertical installation" to the "vertical installation". In this way, when the operation mode shifts to the external communication mode, the detection result of the tape detection sensor 24, which is necessary during the external communication mode, is transmitted to the portable terminal 1. Therefore, it is possible to save labor and time of the user for performing tape information transmission operation after the switching to the external communication mode.

As still another modification, when the posture determining unit 63 determines that the apparatus posture of the tape printing apparatus 2 is changed from the posture other than the "vertical installation" to the "vertical installation", the display of the display screen 22 may be hidden or a light (a backlight) of the display screen 22 may be extinguished. In this case, a part of a display form of the display screen 22 only has to be changed to, for example, hide only apart of information displayed on the display screen 22 or reduce the illuminance of the backlight. By performing display control of the display screen 22 in this way, it is possible to prevent useless power consumption during the external communication mode.

As still another modification, when the apparatus posture of the tape printing apparatus 2 is changed from the posture other than the "vertical installation" to the "vertical installation", auto power-off (a function of automatically turning off the power supply when the keyboard 21 is not operated for a predetermined time) may be disabled. With this configuration, it is possible to prevent the tape printing apparatus 2 from changing to a power-off state against an intention of the user.

As still another modification, when the posture determining unit 63 determines that the apparatus posture is an apparatus posture in which the tape discharge port 43 (a discharge port) faces down, printing execution by the printing unit 69 may be prohibited. By prohibiting the printing execution in the case of the posture in which a left side surface 33 (see FIG. 1) of the tape printing apparatus 2 faces down in this way, it is possible to prevent a situation in which the printing tape is not discharged from the tape discharge port 43 and paper jam is caused.

As still another modification, the apparatus posture may be determined only during the power-on and not determined after the power-on. With this configuration, it is possible to prevent a malfunction in which the operation mode is switched against an intention of the user according to a change of the apparatus posture due to some cause.

Modification 3

In a modification 3, the operation mode of the tape printing apparatus 2 is switched by operation on the portable terminal 1 side. However, this modification is based on the premise that the portable terminal 1 and the tape printing apparatus 2 are capable of communicating even during the standalone mode. In this modification, for example, when mode switching operation from the external communication mode to the standalone mode is performed in the portable terminal 1, the portable terminal 1 transmits the second editing information to the tape printing apparatus 2. When mode switching operation from the standalone mode to the external communication mode is performed in the portable terminal 1, the portable terminal 1 transmits a transmission command for the first editing information to the tape printing apparatus 2. The tape printing apparatus 2 transmits the first editing information to the portable terminal 1 in response to the transmission command. With this configuration, even when the portable terminal 1 and the tape printing apparatus 2 are present in remote places, it is possible to perform a switching instruction for the operation mode and a handover instruction for editing work from the portable terminal 1 side.

Other Modifications

The components in the printing system SY (the portable terminal 1 and the tape printing apparatus 2) explained in the embodiments and the modifications may be provided as a computer program. The computer program may be stored in various recording media (a CD-ROM, a flash memory, etc.) and provided. That is, a computer program for causing a computer to function as the components of the printing system SY and a recording medium having the computer program recorded therein are also included in the scope of the right of the invention. In the embodiment, the example is explained in which the printing apparatus according to the invention is applied to the tape printing apparatus. However, the invention is also applicable to a printing apparatus other than the tape printing apparatus. Besides, changes are possible as appropriate without departing from the spirit of the invention to, for example, realize the portable terminal 1 with another information processing apparatus.

This application claims priority under 35 U.S.C. § 119 to Japanese Patent Application No. 2016-029378, filed Feb. 18, 2016. The entire disclosure of Japanese Patent Application No. 2016-029378 is hereby incorporated herein by reference.

What is claimed is:
1. A tape printing apparatus comprising:
a non-transitory computer-readable temporary storage medium configured to temporarily store first editing information being edited by the tape printing apparatus;
a communication interface, by which the tape printing apparatus communicates with an external apparatus by either a wireless or a wired configuration, the communication interface being configured to:
transmit the first editing information to the external apparatus when an editing information transmission trigger occurs in a state in which the first editing information is stored in the temporary storage medium;
transmit a transmission command to the external apparatus that commands the external apparatus to transmit second editing information being edited by the external apparatus to the tape printing apparatus when a transmission command trigger different from the editing information transmission trigger occurs;
receive the second editing information from the external apparatus; and
at least one processor configured to:
determine an apparatus posture of the tape printing apparatus and to spontaneously perform connection establishment processing when the editing information transmission trigger occurs in the state in which the first editing information is stored in the temporary storage medium and connection to the external apparatus is not established;
generate printing data on the basis of the first editing information or the second editing information stored in the temporary storage medium;
set an operation mode in one of a first mode for performing printing on the basis of printing data transmitted from the external apparatus and a second mode for performing printing on the basis of the printing data generated by the at least one processor; and
set the operation mode in the first mode when the editing information transmission trigger occurs when the operation mode is set in the second mode and set the operation mode in the second mode when the transmission command trigger occurs when the operation mode is set in the first mode,
wherein
the first editing information and the second editing information can include text information, image information, text decoration information, and format information concerning setting of fixed length printing, woven pattern printing, and margins in front and back and above and below a label,
the temporary storage medium stores the second editing information received from the external apparatus, and
the editing information transmission trigger is a determination of a first posture, and the transmission command trigger is a determination of a second posture other than the first posture.
2. The tape printing apparatus according to claim 1 the at least one processor further configured to spontaneously perform connection establishment processing when the transmission command trigger occurs in a state in which connection to the external apparatus is not established.
3. The tape printing apparatus according to claim 1 further comprising a first operation button and a second operation button, wherein the editing information transmission trigger is operation of the first operation button and the transmission command trigger is operation of the second operation button.

4. The tape printing apparatus according to claim 1 wherein the first editing information and the second editing information includes text information and setting information.

5. A control method for a tape printing apparatus comprising:
- storing first editing information being edited by the tape printing apparatus in a non-transitory computer-readable temporary storage medium;
- determining an apparatus posture of the tape printing apparatus;
- transmitting the first editing information to an external apparatus when an editing information transmission trigger occurs in a state in which the first editing information is stored in the temporary storage medium;
- transmitting a transmission command to the external apparatus that commands the external apparatus to transmit second editing information being edited by the external apparatus to the tape printing apparatus when a transmission command trigger different from the editing information transmission trigger occurs;
- receiving the second editing information from the external apparatus;
- storing the second editing information received from the external apparatus in the temporary storage medium;
- performing, spontaneously, connection establishment processing when the editing information transmission trigger occurs in a state in which the first editing information is stored in the temporary storage medium and connection to the external apparatus is not established;
- generating printing data on the basis of the first editing information or the second editing information stored in the temporary storage medium;
- setting an operation mode in one of a first mode for performing printing on the basis of printing data transmitted from the external apparatus and a second mode for performing printing on the basis of the printing data generated by the at least one processor; and
- setting the operation mode in the first mode when the editing information transmission trigger occurs when the operation mode is set in the second mode and set the operation mode in the second mode when the transmission command trigger occurs when the operation mode is set in the first mode, wherein
- the first editing information and the second editing information can include text information, image information, text decoration information, and format information concerning setting of fixed length printing, woven pattern printing, and margins in front and back and above and below a label,
- the temporary storage medium stores the second editing information received from the external apparatus, and
- the editing information transmission trigger is a determination of a first posture, and the transmission command trigger is a determination of a second posture other than the first posture.

* * * * *